United States Patent

[11] 3,610,761

| [72] | Inventors | Patrick H. Cudmore<br>Silver Hill;<br>Peter G. Wilhelm, Kerby Hills, Oxon Hill,<br>both of Md. |
|---|---|---|
| [21] | Appl. No. | 771,938 |
| [22] | Filed | Oct. 30, 1968 |
| [45] | Patented | Oct. 5, 1971 |
| [73] | Assignee | The United States of America as represented by the Secretary of the Navy |

[54] ELECTROOPTICAL ASPECT ERROR SENSING SYSTEM FOR A STABILIZED SATELLITE
9 Claims, 4 Drawing Figs.

[52] U.S. Cl................................................... 356/141,
356/152
[51] Int. Cl......................................................G01b 11/26

[50] Field of Search........................................... 356/141,
152

[56] References Cited
UNITED STATES PATENTS
| 3,341,707 | 9/1967 | Wingfield..................... | 356/141 X |
| 3,340,763 | 9/1967 | Power.......................... | 356/152 |

FOREIGN PATENTS
| 164,963 | 1964 | U.S.S.R........................ | 356/152 |

Primary Examiner—Rodney D. Bennett, Jr.
Assistant Examiner—Joseph G. Baxter
Attorneys—R. S. Sciascia, J. G. Murray and A. L. Branning ABSTRACT: System for sensing vertical axis deviation of a gravity stabilized satellite. Electrooptical sensors respond to horizon to produce signals that are indicative of satellite attitude and which modulate transmitted radio signal.

PATENTED OCT 5 1971 3,610,761

INVENTORS
PATRICK H. CUDMORE
PETER G. WILHELM

BY James D Murray

ATTORNEYS

3,610,761

ELECTROOPTICAL ASPECT ERROR SENSING SYSTEM FOR A STABILIZED SATELLITE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

As the use of space satellites become more and more sophisticated, the need arose for earthward facing satellites, i.e. for satellites which could either be controlled so that a particular satellite axis was aligned with the gravitational field or the deviation from the desired alignment could be measured and data evaluated accordingly. Examples of such necessarily downward facing satellites are to be found in many weather and navigational systems.

Prior to this invention, the orientation of downward facing satellites has been controlled or measured by systems which utilized magnetometers, solar or infrared sensors, and gravity devices. These prior art systems were in general unsatisfactory in being undesirably heavy, having large power requirements, involving tedious computations, often fail to operate, etc.

SUMMARY OF THE INVENTION

The invention disclosed herein avoids the disadvantages of the prior systems in that the orientation of a satellite with respect to the earth is measured by a lightweight system that has a low-power requirement, is reliable and which includes electrooptical sensors and a simple radio transmitter. The electrooptical sensors modulate the transmitter signal so that information is received on earth in a form which is readily interpreted. Either corrective orientation commands can then be given or other data received from the satellite can be analyzed in such a manner as to compensate for any error in the satellite orientation.

OBJECTS OF THE INVENTION

It is, therefore, an object of the invention to provide an improved system for determining the attitude of a satellite.

Another object is to provide an improved system for measuring the orientation of a satellite by means of apparatus that is lightweight, reliable, has low-power requirements and that transmits signals which are representative of the satellite orientation.

Still another object of the invention is the provision of a system which includes electrooptical sensors that are operatively coupled to a radio transmitter.

A still further object is to provide an improved system for measuring the orientation of a satellite by means of apparatus that is lightweight, reliable, has low-power requirements and includes electrooptical sensors that are operatively coupled to a simple radio transmitter, the signal of which is modulated to be representative of the satellite orientation.

DESCRIPTION OF THE DRAWINGS

Other objects, advantages and novel features of the invention will become apparent from the following detailed description of the invention when considered in conjunction with the accompanying drawings where.

DESCRIPTION OF THE PREFERRED EMBODIMENT

Figure 1:
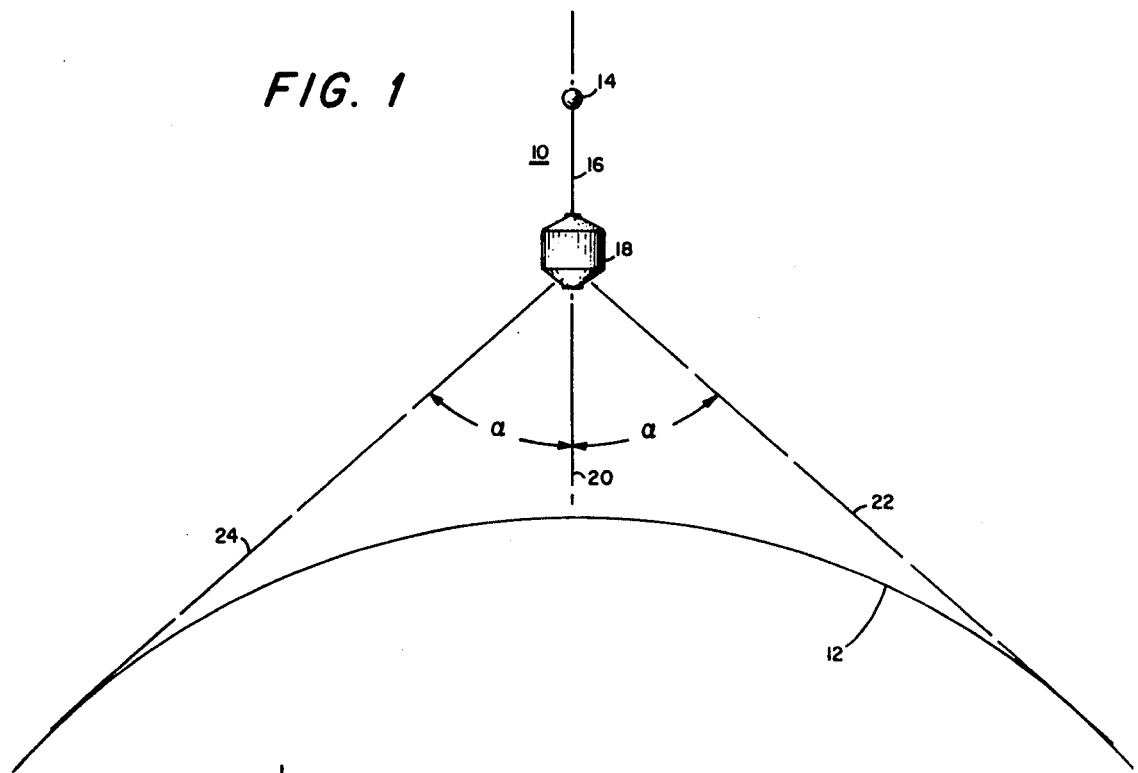
FIG. 1 shows a gravity stabilized weather satellite in orbit about the earth.

Referring now to the drawings, wherein like reference characters designate like or corresponding parts throughout the several views, there is shown in FIG. 1 a gravity stabilized weather satellite 10 which is in orbit about the earth 12. FIG. 1 is, of course, much distorted in scale. The small satellite 10 has been, of necessity, greatly magnified both in relation to the size of the earth and in relation to the satellite altitude, typically 500 miles.

The satellite 10 is in the form of a dumbbell and includes a weight 14 extended by a boom 16 from the main or payload portion 18. Such a satellite configuration has the advantage of providing a large moment of inertia and associated stability about the pitch and roll axes as compared to the yaw axis 20. When the axis 20 is vertical i.e. aligned with the gravitational field, the angle $\alpha$ between the axis 20 and the direction of the horizon, illustrated by the dashed lines 22 and 24, is equal in all directions.

Figure 2:
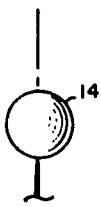
FIG. 2 presents the satellite in more detail.
Figure 2:
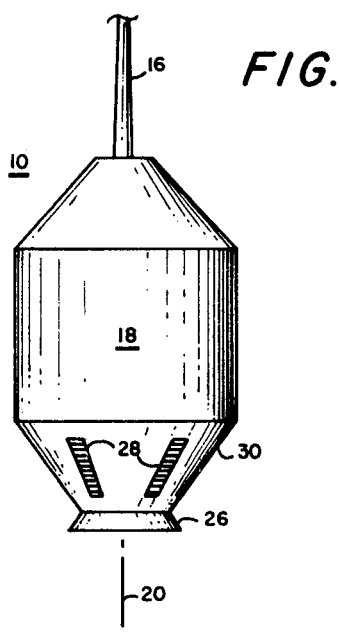

FIG. 2 illustrates the satellite 10 in more detail, particularly as to the payload portion 18. Apparatus 26, which typically is a camera or antenna, is located at the bottom of the satellite. For operational reasons, which need not be described here, it is often desirable to have the apparatus 26 point directly at the earth, which will occur when the axis 20 is vertical, i.e. aligned with the gravitational field.

While the configuration of satellite 10 will cause axis 20 to be generally aligned as desired, long period oscillations or misalignment may occur for a number of reasons, such as bending and twisting of boom 16, interaction with earth's magnetic field, etc. For the purpose of measuring and/or correcting deviations of axis 20 from the vertical, a plurality of electrooptical sensors 28 are located in the bottom portion 30 of the payload section 18.

Figure 3:
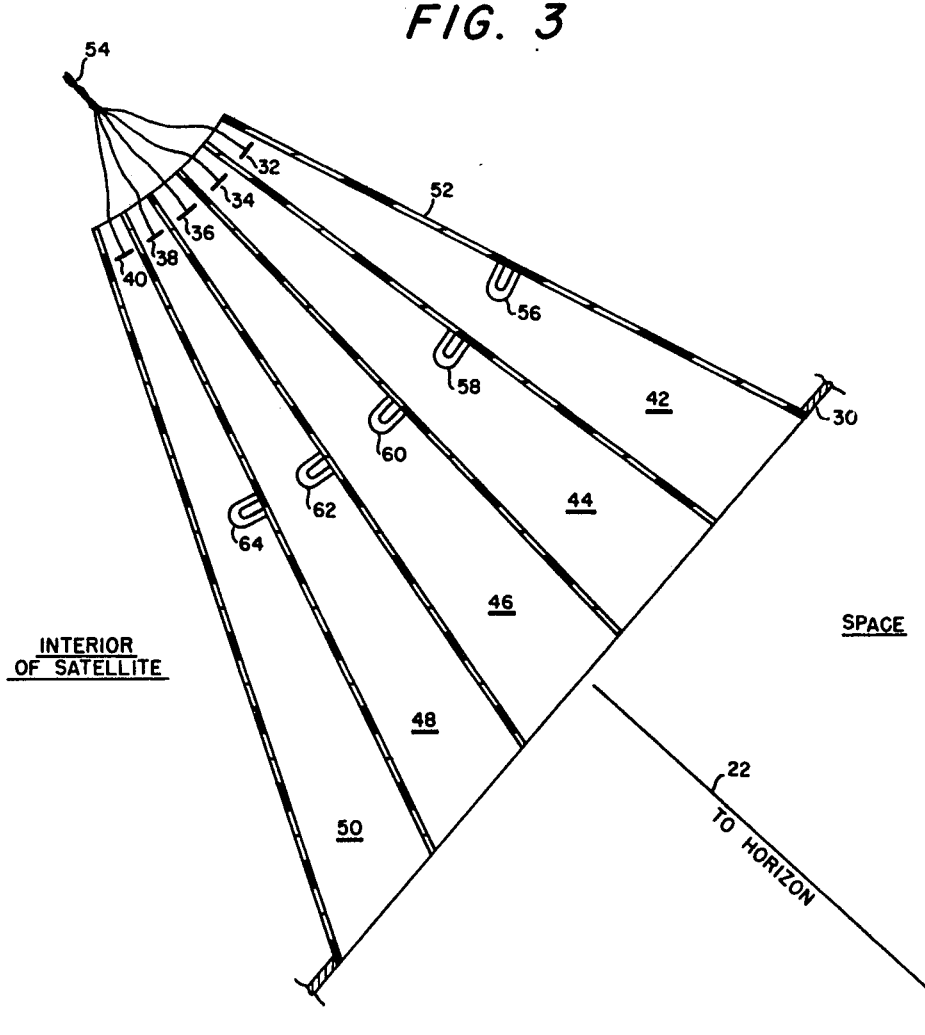
FIG. 3 illustrates the electrooptical sensors of the invention.

FIG. 3 illustrates a sensor 28 in more detail. Five optical detectors 32, 34, 36, 38 and 40, which typically are Texas Instrument Company LS 400 silicon planar phototransistors, are positioned in the five passageways 42, 44, 46, 48 and 50 of a casing 52 that is preferably made of a suitable plastic. Casing 52 is located in the interior of payload section 18. The passageways of casing 52 are divergently pointed, through an opening in the exterior of the bottom portion 30, in the general direction 22 of the horizon.

The five optical detectors 32, 34, 36, 38 and 40 are connected, as shown, through a wire bundle 54 to electronic circuitry which is to be later described. Lamps 56, 58, 60, 62 and 64, which are respectively located in the passageways 42, 44, 46, 48 and 50, are also connected by leads (which are not shown) through the wire bundle 54 to other electronic circuitry which is conventional and need not be described in detail. For purposes of disclosing the present invention, it is only necessary to state that these lamps can be lighted by radio command and function to individually illuminate and test the detectors 32, 34, 36, 38 and 40 and to thus provide circuit failure information.

Figure 4:
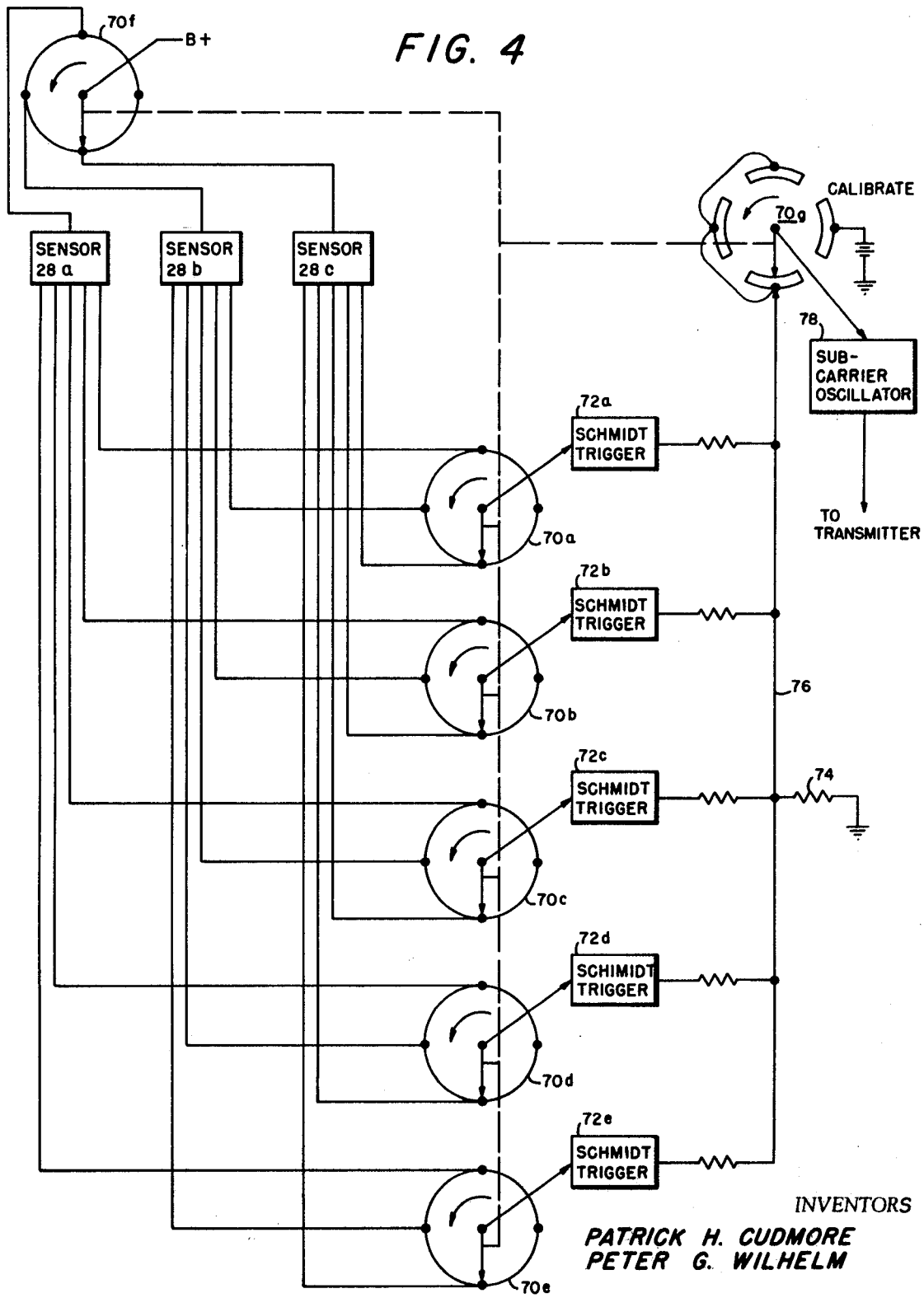
FIG. 4 is a block diagram of the invention.

Referring now to FIG. 4, which illustrates the invention by means of a block diagram, the three sensors 28, which are further identified as 28a, b and c, are sequentially connected to a positive source of voltage B$^+$ by section 70f of a motorized switch 70 that includes mechanically connected sections 70a through g which are driven in synchronism. Switch sections 70a, b, c, d and e are connected, as shown, so that the five detectors 32, 34, 36, 38 and 40 of one of the sensors 28a, b or c are respectively connected to the Schmidt triggers 72a, b, c, d and e at the same time the particular sensor is connected to the positive voltage source B$^+$. The Schmidt triggers 72, which are preferably transistorized circuits, produce a constant output whenever the input voltage (from the optical detectors 32, 34, 36, 38 and 40) exceeds a certain minimum level. The outputs of the Schmidt triggers 72a, b, c, d and e are summed by resistor 74 which is connected between the paralleled triggers and ground. The voltage on lead 76 is applied to subcarrier oscillator 78 through switch section 70g and is indicative of how many of the five triggers 72a, b, c, d and e are producing an output in response to a signal from the five detectors 32, 34, 36, 38 and 40 of a particular sensor 28a, b or c. The subcarrier oscillator 78 is, in turn, connected to a transmitter which functions to telemeter information to earth.

The operation of the invention is by now apparent. The satellite 10 is placed in orbit by appropriate rocketry. This orbit typically is of low eccentricity at an altitude of 500 nautical miles. After achieving this orbit, the weight 14 is extended by boom 16 and the satellite 10 becomes gravity stabilized in an orientation generally suited for operation of apparatus 26.

At this time it will be necessary to obtain accurate information as to the deviation of axis 20 from the vertical direction. After testing the sensors 28a, b and c by the lamps 56, 58, 60, 62 and 64 in these sensors and ascertaining that all of the detectors 32, 34, 36, 38 and 40 are operative, the circuitry of FIG. 4 is used to determine the orientation of the satellite 10 relative to the earth. Detectors in passageways 42, 44, 46, 48 and 50 which are pointed at illuminated surfaces, such as the sunlit earth, will cause associated triggers 72 to produce an output while the detectors in passageways pointing at the darkness of space will not cause a trigger output. As the wipers of switch 70 rotate, the satellite transmitter is response to the subcarrier oscillator 78 will telemeter signals sequentially indicative of a calibration and of the number of triggers 72 energized by illuminated detectors in the sensor 28a, then in the sensor 28b and then in the sensor 28c. After a calibration signal the sequence is repeated. The information telemetered to earth can be used to correct other data for the deviation of axis 20 from the vertical or to issue command signals intended to eliminate the deviation.

Obviously many modifications and variations of the present invention are possible in the light of the above teachings. For example, the use of more sensors or the use of more detectors per sensor would obviously improve the accuracy of the invention. It is therefore to be understood that within the scope of the appended claims the invention may be practiced otherwise than as specifically described.

1. An electrooptical system for detecting the orientation of a satellite relative to the earth comprising:
   a plurality of electrooptical sensing means located on said satellite, each sensing means being light responsive relative to the amount of reflected light received and functioning to produce a first output when pointing toward a substantially reflective area of the earth, a second output when pointing toward a nonreflective area of space surrounding earth and a third, variable output, quantitatively between said first and second outputs when pointing toward the interface of said reflective and nonreflective areas and
   transmitting means sequentially connected to said plurality of electrooptical sensing means and producing a signal representative of the output of the connected sensing means.

2. The electrooptical system set forth in claim 1 wherein each of said plurality of electrooptical sensing means includes:
   a casing having a plurality of divergent passageways, each passageway opening to the exterior of said satellite and
   detecting means located in each of said divergent passageways and functioning to change in an electrical characteristic in response to incident light.

3. The electrooptical system set forth in claim 2 wherein each of said plurality of electrooptical sensing means further includes testing means located in each of said divergent passageways for testing the operativeness of said detecting means.

4. In combination with a gravity stabilized satellite, an electrooptical system for detecting the misalignment of the vertical axis of said satellite with the gravitational field comprising:
   a plurality of electrooptical sensing means arranged on said satellite to point to different locations on the horizon when said satellite is in an orbit of predetermined altitude and the vertical axis of said satellite is aligned with the gravitational field, each of said electrooptical sensing means being light responsive relative to the amount of reflected light received and functioning to produce a first output when pointing toward a substantially reflective area of the earth, a second output when pointing toward a substantially nonreflective area of space surrounding the earth and a third, variable output, quantitatively between said first and second outputs when pointing toward the horizon, said horizon being the interface between said reflective and nonreflective areas;
   transmitting means for broadcasting a signal representative of an input signal applied to said transmitting means and
   switching means for sequentially connecting the outputs of said plurality of electrooptical sensing means to said transmitting means
   whereby the signals broadcast by said transmitting means are indicative of the misalignment of the vertical axis of said satellite with the gravitational field.

5. The combination of claim 4 wherein each of said plurality of electrooptical sensing means includes:
   a casing having a plurality of divergent passageways, each passageway opening to the exterior of said satellite and
   detecting means located in each of said divergent passageways and functioning to change in an electrical characteristic in response to incident light.

6. The combination of claim 5 wherein each of said plurality of electrooptical sensing means further includes testing means located in each of said divergent passageways for testing the operativeness of said detecting means.

7. The combination of claim 5 wherein said switching means comprises:
   a motor driven switch having a number of sections that are driven in synchronism, said number of sections being at least as large as the number of detecting means located in the plurality of divergent passageways in said casing of each of said electrooptical sensing means;
   a plurality of Schmidt Trigger circuits each having an input and an output, said plurality being equal in number to the number of detecting means in each of said electrooptical sensing means, the inputs of said plurality of Schmidt Trigger circuits being connected in parallel to an equal number of switch sections and the outputs of said plurality of Schmidt Trigger circuits being applied as the input signal to said transmitting means and
   connecting circuit means connecting said detecting means in said plurality of electrooptical sensing means to said equal number of switch sections in such a manner that the inputs of said plurality of Schmidt Trigger circuits are simultaneously connected to the said number of detecting means in sequentially different ones of said plurality of electrooptical sensing means
   whereby the signals broadcast by said transmitting means are indicative of the condition of sequentially different ones of said plurality of electrooptical sensing means.

8. The combination of claim 7 wherein said detecting means are phototransistors.

9. The combination of claim 8 wherein each of said plurality of electrooptical sensing means further includes testing means located in each of said divergent passageways for testing the operativeness of each phototransistor.